United States Patent [19]

Knothe et al.

[11] Patent Number: 4,487,280

[45] Date of Patent: Dec. 11, 1984

[54] HIGH-RESOLUTION ELECTRONIC BALANCE

[75] Inventors: Erich Knothe, Bovenden; Franz-Josef Melcher, Hardegsen; Christian Oldendorf, Göttingen; Jürgen Ober, Hardegsen, all of Fed. Rep. of Germany

[73] Assignee: Sartorius GmbH, Fed. Rep. of Germany

[21] Appl. No.: 480,721

[22] Filed: Mar. 31, 1983

[30] Foreign Application Priority Data

Apr. 7, 1982 [DE] Fed. Rep. of Germany ....... 3213016

[51] Int. Cl.³ .......................... G01G 7/00; G01G 3/14
[52] U.S. Cl. .............................. 177/212; 177/210 EM
[58] Field of Search .......................... 177/210 EM, 212

[56] References Cited

U.S. PATENT DOCUMENTS 4,034,819  7/1977  Akers et al. ..................... 177/212 X
4,189,017  2/1980  Strobel et al. ....................... 177/212
4,300,647  11/1981  Knothe et al. ...................... 177/212

*Primary Examiner*—George H. Miller, Jr.
*Attorney, Agent, or Firm*—Eric P. Schellin

[57] ABSTRACT

A correction of temperature errors of the measured value receiver is generally necessary in high-resolution electronic balances. This can be accomplished in a known manner by directly influencing the measured value receiver with the aid of an analogous temperature sensor or by digitizing the output signal of the temperature sensor in a digitizer on the output side and performing the correction in the digital signal processing part. The invention has the task of indicating a circuit which permits the high-resolution digitizer which is present in the balance in any case to be used for digitizing the temperature signal without diminishing its preciseness. A switch (25 in FIG. 1) is provided to this end which feeds the output signal of a temperature sensor (27) to the input of the digitizer (15) in addition to the signal of the measured value receiver (1 ... 13) at certain times controlled by the digital signal processing unit (22). The sensitive measuring path of the balance is therefore not reversed as it is in the case of customary selector switches, but the temperature signal is added to the measured signal of the balance at certain times and calculated by the digital electronic elements.

10 Claims, 2 Drawing Figures

HIGH-RESOLUTION ELECTRONIC BALANCE

BACKGROUND OF THE INVENTION

The invention concerns an electronic balance with a measured value receiver which emits an analogous voltage or current signal with a high-resolution digitizer on the output side, with a digital signal processing unit, e.g. in the form of a microprocessor, and with means for correcting temperature errors of the measured value receiver.

A balance of this type is known, e.g. from DE-OS No. 30 33 272. The correction of temperature errors of the zero point is achieved in it by a current controlled in dependency on the temperature which produces in cooperation with a magnetic field a temperature-dependent additional force on the measured value receiver. However, this direct intervention in the measured value receiver is complicated, especially if not only the temperature error of the zero point but also any temperature error of the sensitivity or of the linearity should be corrected. It is therefore obvious to shift the correcting of the temperature errors to the digital signal processing unit, since all temperature-dependent corrections can be calculated there with one temperature measured value. DE-OS No. 31 06 534 therefore suggested providing separate temperature, moisture and pressure sensors, the analogous output signals of which are fed in succession to a digitizer. The digital signal processing unit can then calculate the necessary corrections from the digitized values. The disadvantage of this, however, is the additional expense for the separate digitizer on the output side of the sensors.

The obvious solution of feeding the output signal of the actual measured value receiver of the balance and the output signal of the temperature sensor(s) in succession over selector switches to the high-resolution digitizer can not be accomplished, because a switch in the measuring path from the measured value receiver to the digitizer would very adversely effect the preciseness of the balance.

The invention has the task of digitizing the analogous output signal of one or more temperature sensors (or of one or more similar sensors) without having to use an additional digitizer and without adversely affecting the preciseness of the digitizing of the output signal of the actual measured value receiver of the balance.

The invention solves this task by providing a switch which feeds the output signal of at least one temperature sensor to the input of the digitizer in addition to the signal of the measured value receiver at certain times controlled by the digital signal processing unit.

Therefore, the sensitive measuring path from the measured value receiver of the balance to the high-resolution digitizer is not interrupted and the output signal of the temperature sensor (s) is fed in addition to the input of the digitizer at certain times. The digital signal processing unit on the output side can then compute the output signal of the temperature sensor (s).

It is advantageous if the temperature sensors are dimensioned and connected in such a manner that their maximum output signal at the input of the digitizer is at least 10 times smaller than the maximum signal of the actual measured value receiver of the balance. This means that the measuring range of the digitizer is hardly limited at all for the actual measured value receiver of the balance. Nevertheless, the measuring preciseness of the temperature measuring is sufficient on account of the high resolution of the digitizer. In a balance with e.g. 100,000 increments resolution the temperature sensors are normally at 200 increments at the most. Thus, a preciseness of 1 part per thousand is amply sufficient for measuring the temperature, which is achieved in a digitizer with 100,000 increments resolution as early as at an input signal of 1% of the maximum input signal.

It is advantageous to construct the input of the digitizer as a current dip. This lets the summation of the two signals from the measured value receiver and from the temperature sensor (s) be performed without feedback as current summation.

It is advantageous if the digital signal processing unit contains a standstill monitoring circuit and actuates the switch which feeds the output signal of at least one temperature signal to the input of the digitizer in addition to the signal of the measured value receiver only when the standstill monitoring circuit announces a standstill. For the measuring of the output signal of the temperature sensors is not falsified by changes of the signal of the actual measured value receiver only when the balance is at a standstill.

It is advantageous if the output signal of the temperature sensor (s) is calculated by the signal processing unit according to the formula $$U_T = U_1 - \tfrac{1}{2}(U_0 + U_2).$$

In this formula $U_0$ represents the output value of the digitizer before the switch is actuated, $U_1$ is the corresponding signal during the actuation phase of the switch and $U_2$ is the corresponding signal after the end of the actuation phase of the switch. Thus, the difference of the signal during the actuation of the switch and of the average value of the two signals before and after is formed. It is advantageous if all values $U_0$, $U_1$ and $U_2$ are not measured until the standstill monitoring circuit is actuated. It is advantageous if the digital signal processing unit additionally checks whether the initial value $U_0$ and the final value $U_2$ coincide within a certain error tolerance and evaluates the calculated value for $U_T$ only in this instance. If this means that a value for $U_T$ can be calculated and evaluated only relatively infrequently in comparison to the measuring cycle of the digitizer, this does not pose a problem, since the temperature in the balance changes only very slowly due to its heat inertia. An analogous situation applies to moisture sensors or air pressure sensors, which can of course be present in addition to the temperature sensors or instead of the temperature sensors, and the output signal of which can be digitized and calculated in the manner described.

The invention is described in the following using the example of a balance in accordance with the principle of the electromagnic compensation of force with reference made to the schematic figures.

Figure 1:
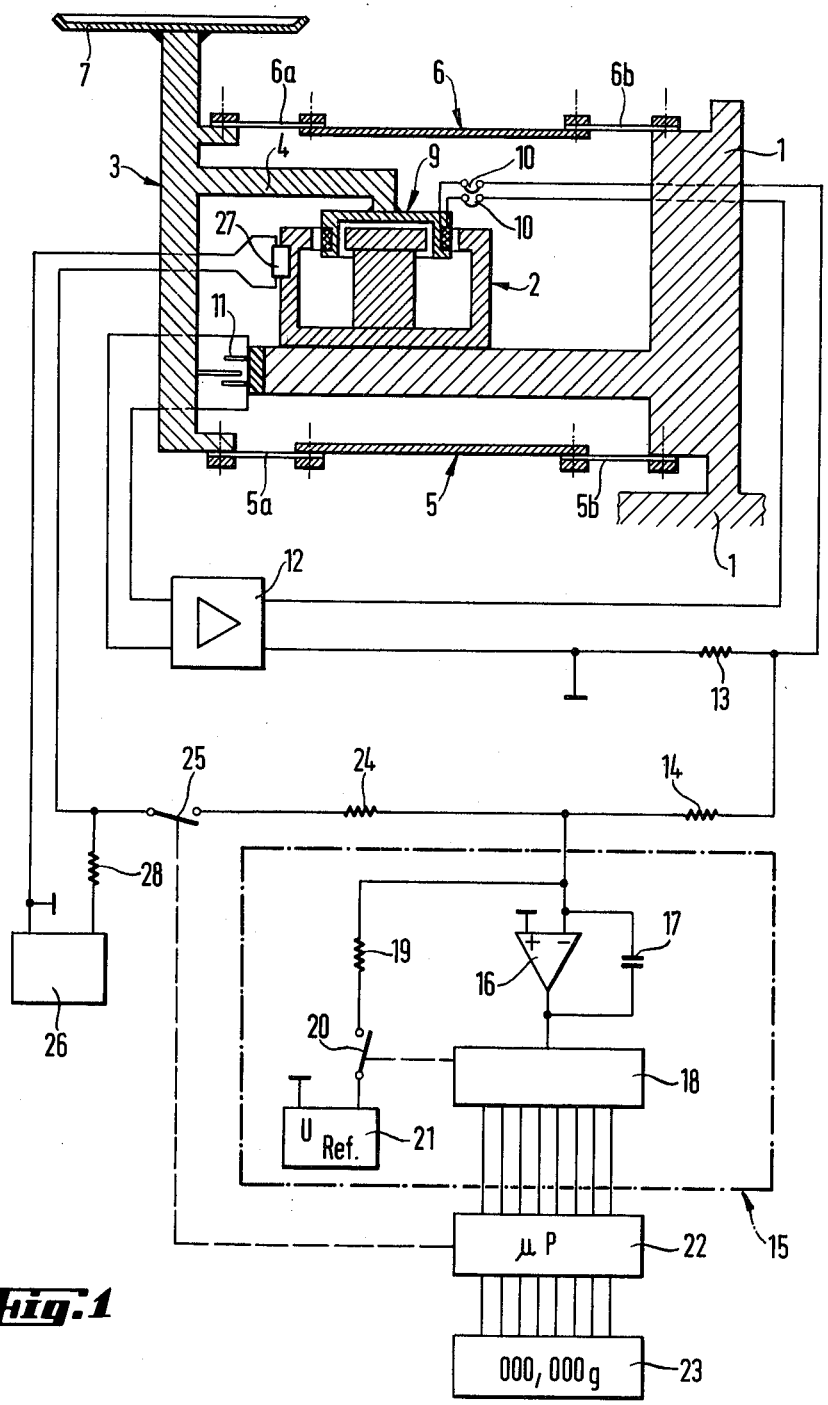
FIG. 1 shows a longitudinal section through the essential mechanical parts of the balance and the associated electronic elements (partially in a block wiring diagram).

The measured value receiver of the electronic balance in FIG. 1 consists to a movable load receiver 3 which carries load scale 7 and is connected over two guide bars 5 and 6 in the form of a parallel guide to part 1 of the balance, which part is fixed to the housing. Leaf springs 5a, 5b and 6a, 6b at the ends of guide arms 5 and 6 function as articulations. Load receiver 3 carries coil 9 on projecting arm 4, which interacts with the field of permanent magnet system 2 fixed to the housing. Position sensor 11 scans the position of load receiver 3 and supplies the current needed to compensate the load over controlled-gain amplifier 12. This compensation current is supplied over movable leads 10 to coil 9 and flows through precision resistor 13 at the same time. A current-proportional measuring voltage is taken off at precision resistor 13 and fed over resistor 14 to the input of digitizer 15. The current through resistor 14 represents the input signal of the digitizer. The digitizer consists of an integrator constructed by operations amplifier 16 and feedback capacitor 17 and of control unit 18, which periodically closes switch 20, thereby sending a current from reference voltage source 21 over resistor 19 into integrator 16, 17, the polarity of which is opposite to the polarity of the measuring current through resistor 14. The pulse-duty factor for switch 20 is selected by control unit 18 so that the chronological average value of the two currents through resistors 14 and 19 is oppositely equal, so that the load on feedback capacitor 17 does not change on the average. This pulse-duty factor can then be easily digitized by high-frequency timing pulses. Details of this known digitizer circuit are described, for example, in DE-PS No. 21 14 141.

The digitized measured value from digitizer 15 is taken by digital signal processing unit 22, which can be a microprocessor, for example. Various programs for processing measured values are provided there, such as, for example, standstill monitoring, average value formation, calibration, correction of temperature errors, etc. The result is fed to a display memory and displayed in digital display 23.

Temperature sensor 27 for measuring the temperature is provided on the measured value receiver. In the example shown temperature sensor 27 is fastened to permanent magnet system 2. A temperature-dependent resistor or a semiconductor-p-n-transition, the forward voltage of which is temperature-dependent, is used as temperature sensor. Temperature sensor 27 is connected over resistor 28 to constant voltage source 26. The temperature-dependent voltage drop at temperature sensor 27 allows an additional current to flow into the input of digitizer 15 when switch 25 is closed over (highly resistive) resistor 24. Thus, when switch 25 is closed, the sum of the measured signals from the actual measured value receiver 1 . . . 13 and from temperature sensor 27 is fed to the input of digitizer 15, while when switch 25 is open, only the measured signal from the actual measured value receiver is fed to the input of the digitizer. Digital signal processing unit 22, which controls switch 25, can then determine both the output signal of the actual measured value receiver and also the output signal of temperature sensor 27. Switch 25 can be either a mechanical relay or an electronic FET switch. Instead of the one temperature sensor 27 on permanent magnet system 2, several temperature sensors can be connected in series at various points of the measured value receiver, and the sum of the voltage drops can be fed over switch 25 to the input of digitizer 15. This makes it possible to form an average value of the temperature inside the essential parts of the measured value receiver.

Figure 2:
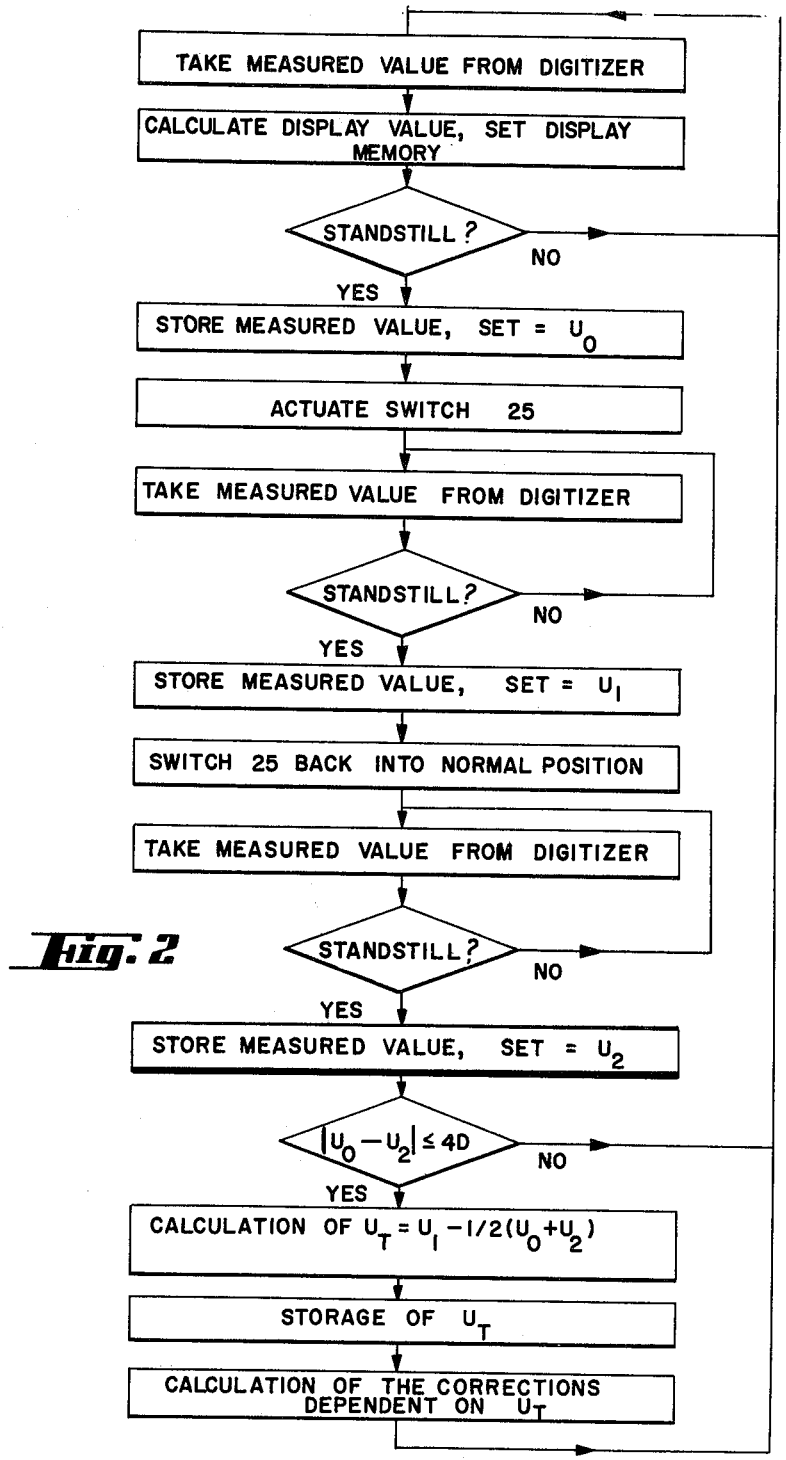
FIG. 2 shows a flow chart of the measuring and evaluation for the balance of FIG. 1.

The details of such a measuring process are shown in FIG. 2 in the form of a flow chart.

In the normal state switch 25 is open and the digital signal processing unit takes a measured value from the digitizer which corresponds to the output signal of the actual measured value receiver, calculates from it the value to be displayed and controls the display memory and the display with it. This measured value is compared at the same time with the preceeding measured values, in which way a standstill monitoring is performed. If, for example, substance is being dosed onto the weighing scale, so that no standstill of the measured value occurs, the digital signal processing unit remains continuously in this loop and allows the display to follow constantly the changing output signal of the measured value receiver. When the dosing is over, several identical measured values occur in succession, so that the standstill monitor determines a standstill. These identical measured values are stored as $U_0$. Then, the digital signal processing unit actuates switch 25 and waits in a measured value acceptance loop until the standstill monitor again announces standstill. The new measured value is stored as $U_1$ and switch 25 is subsequently put back into its normal position (open). Standstill is again waited for in a measured value acceptance loop and the measured value at standstill is stored as $U_2$. The digital signal processing unit then checks whether the stored measured values $U_0$ and $U_2$ differ by at the most 4 d. If the deviation is greater, the entire measured series is not evaluated, as material to be weighed was probably put on or taken off the scale in the meantime. However, if the deviation is smaller, the average value $\frac{1}{2}(U_0+U_2)$ is calculated and substracted from the stored value $U_1$. The value $U_T$ obtained in this manner then represents the output signal of temperature sensor 27. It is stored and used to calculate the temperature-dependent corrections. These corrections can refer to the zero point, the sensitivity and/or the linearity. Then, a new measured value is taken from the digitizer, the display value derived from it is calculated and taken into the display, which up to this point had displayed the last-calculated value. Then, a new cycle can begin.

This process just described and shown in FIG. 2 naturally represents only the basic process, which must be supplemented in detail, for example, by delay stages, a limitation of the circulations in the measured value acceptance loops for $U_1$ and $U_2$, etc., which can easily be performed by any data processing expert.

The circuit presented above using a temperature sensor as an example can of course be adapted with ease to suit other environmental sensors too, e.g. moisture sensors, pressure sensors, acceleration sensors, oblique position sensors, etc. It is likewise easily possible to determine, digitize and evaluate for purposes of correction the temperature at several points separately or several different environmental parameters by means of several switches 25 which are associated with different sensors and are actuated in successively occuring measuring cycles. The separate determination of the temperature at several points can be significant if the requirements are very high, if, for example, the temperature measured at the permanent magnet system is to be used more for correcting the sensitivity, while the temperature in the vicinity of the parallel guide is to be used more for correcting the zero point.

We claim:

1. Electronic balance comprising a measure value receiver which emits an analog electrical signal, a high-resolution digitizer on the output side, a digital signal processing unit, and means for correcting errors caused by the temperature of the measured value receiver, characterized in that a switch (25) is provided which feeds the output signal of at least one temperature sensor (27) to the input of the digitizer (15) in addition to the signal of the measured value receiver (1 ... 13) at certain times controlled by the digital signal processing unit (22).

2. Electronic balance according to claim 1 wherein said digital signal processing unit comprises a microprocessor.

3. Electronic balance according to claim 2, characterized in that the maximum output signal of the temperature sensor (27) fed to the input of the digitizer (15) is at least 10 times smaller than the maximum signal of the measured value receiver (1 ... 13).

4. Electronic balance according to either claim 2 or 3, characterized in that the input of the digitizer is constructed as a current dip.

5. Electronic balance according to either claim 2 or 3, characterized in that the digital signal processing unit (22) contains a standstill monitoring circuit.

6. Electronic balance according to claim 5, characterized in that the switch (25) which feeds the output signal of at least one temperature sensor (27) to the input of the digitizer (15) in addition to the signal of the measured value receiver (1 ... 13) is actuated only if the standstill monitoring circuit announces standstill.

7. Electronic balance according to either claim 2 or 3, characterized in that the output signal ($U_T$) of the temperature sensor (27) is calculated by the digital signal processing unit (22) according to the formula $$U_T = U_1 - \tfrac{1}{2}(U_0 + U_2)$$

whereby $U_0$ represents the output value of the digitizer before the switch (25) is actuated, $U_1$ is the output value of the digitizer when the switch (25) is actuated, and $U_2$ is the output value of the digitizer after the end of the actuation of the switch (25).

8. Electronic balance according to claim 7, characterized in that the digital signal processing unit (22) only processes the calculated value for the output signal of the temperature sensor (27) further if $U_0$ and $U_2$ coincide within a certain error tolerance.

9. Electronic balance comprising a measure value receiver which emits an analog electrical signal, a high-resolution digitizer on the output side, a digital signal procession unit, and means for correcting errors caused by the temperature of the measure value receiver, characterized in that the input of the digitizer (15) is connected on first over a resistor (14) to the measure value output of the measured value receiver (1 ... 13) and second over another resistor (24) and a switch (25) to the output of a temperature measuring circuit (26 ... 28), and that the switch (25) is actuated (=closed) at certain times controlled by the digital signal processing unit (22).

10. Electronic balance according to claim 9 wherein said digital signal processing unit comprises a microprocessor.

* * * * *